United States Patent [19]
Tomikawa et al.

[11] Patent Number: 5,588,357
[45] Date of Patent: Dec. 31, 1996

[54] SHOCK WAVE STERILIZER

[75] Inventors: Hisao Tomikawa, Takatsuki; Hideo Matsuo; Kazuhito Fujiwara, both of Kumamoto, all of Japan

[73] Assignee: Tsubakimoto Chain Co., Osaka, Japan

[21] Appl. No.: 328,830

[22] Filed: Oct. 25, 1994

[30] Foreign Application Priority Data

Oct. 25, 1993 [JP] Japan ..................... 5-266403

[51] Int. Cl.$^6$ ..................... A23L 3/32
[52] U.S. Cl. ..................... 99/451; 99/483; 422/127
[58] Field of Search ..................... 99/451, 483, 358, 99/452; 204/137, 149, 164, 169, 302; 422/22, 39, 127

[56] References Cited

U.S. PATENT DOCUMENTS

| | | | |
|---|---|---|---|
| 3,594,115 | 7/1971 | Wesley et al. | 426/238 |
| 5,048,404 | 9/1991 | Bushnell et al. | 99/451 |
| 5,273,766 | 12/1993 | Long | 99/451 |

FOREIGN PATENT DOCUMENTS

| | | |
|---|---|---|
| 4206978A1 | 7/1993 | Germany. |
| 1105913 | 3/1968 | United Kingdom. |

*Primary Examiner*—David Scherbel
*Assistant Examiner*—Reginald L. Alexander
*Attorney, Agent, or Firm*—Darby & Darby, P.C.

[57] ABSTRACT

A shock wave sterilizer for sterilizing a fluid medium, such as food, by having the fluid medium in an elastic container impacted by shock waves and expansion waves emitted from a shock wave source formed by a source of electric current discharging through an electrical conductor to vaporize the electrical conductor to produce a shock wave that is transmitted through a pressure transfer medium to the container and the fluid medium therein.

10 Claims, 5 Drawing Sheets

SHOCK WAVE STERILIZER

BACKGROUND OF THE INVENTION

1. Field of the Invention

The present invention relates to a shock wave sterilizer for sterilizing fluid or liquid food including various juices, cooling beverage, milk, yogurt, and so forth.

2. Description of Related Art

A thermal sterilization method and a high pressure sterilization method are known as means for sterilizing these kinds of food. In the thermal sterilization method, food is heated at a predetermined temperature through a thermal conduct so that the food can be sterilized. In the high pressure sterilization method, food is subjected to a high pressure, typically hundreds to thousands times atmospheric pressure to be sterilized.

However, the thermal sterilization method, results in degeneration of protein in food because of heating. In addition, thermally sterilized food sometimes emits a smell unique to thermal sterilization. On the other hand, a conventional apparatus for the high pressure sterilization method is large, and its sterilizing ability is poor since the apparatus is incapable of performing successive sterilization.

SUMMARY OF THE INVENTION

The present invention has been made to solve such problems. A principal object of the present invention is to provide an inexpensive shock wave sterilizer which efficiently sterilizes food by using a shock wave.

A shock wave sterilizer in accordance with the present invention is characterized in comprising an elastic container for containing food, a shock wave source which is disposed to face the elastic container and a pressure transfer medium which is interposed between the shock wave source and the elastic container.

A shock wave emitted from the shock wave source is transferred to the elastic container through the pressure transfer medium, thereby the shock wave is first applied onto food contained in the container and an expansion wave is next applied onto the food with little time delay. When the shock wave and the expansion wave are applied, differences in the shock impedance of materials constituting a cell of bacteria create differences in the pressure change within the cell. This in turn creates non-equilibrium force in the cell, and as a result, the cell is destroyed and the food is sterilized. The time required for radiating the shock wave is only a few hundred micro-seconds so that there will be no chemical change due to a high temperature or a change in the pressure such as thermal degeneration of protein or the like. Therefore, food can be sterilized at a normal temperature. Further, reliable sterilization is possible without any large scale complex apparatus.

In addition, by supplying food into the elastic container through a supply pipe and discharging processed food through a discharge pipe, food can be sterilized successively.

Still further, batch sterilization is realized when the elastic container is constructed so as to seal contained food inside.

The above and further objects and features of the invention will more fully be apparent from the following detailed description with accompanying drawings.

DESCRIPTION OF THE PREFERRED EMBODIMENTS

In the following, the present invention will be described in relation to preferred embodiments thereof while referring to the associated drawings.

Embodiment 1

Figure 1:
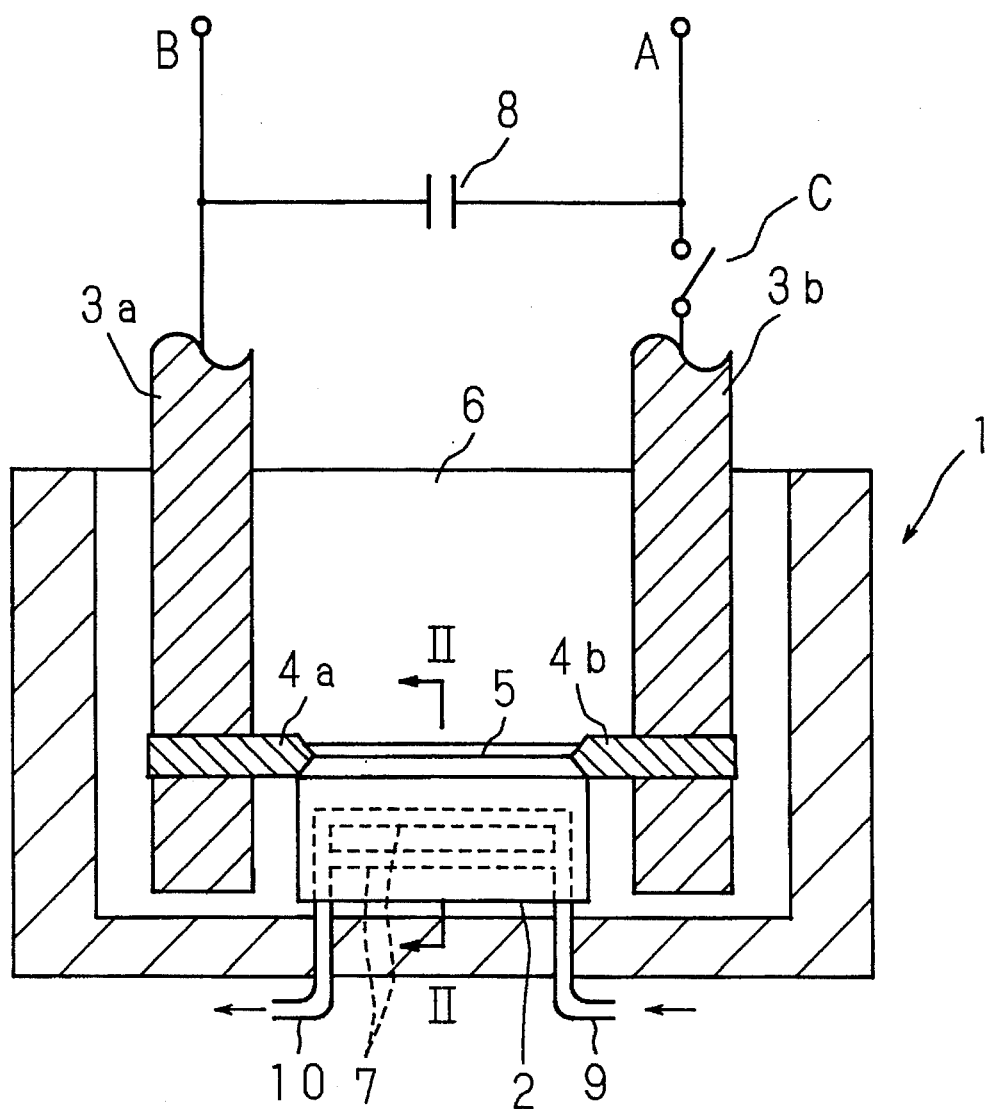
FIG. 1 is a schematic vertical cross sectional view showing a structure of a shock wave sterilizer according to a first embodiment of the present invention.
Figure 2:
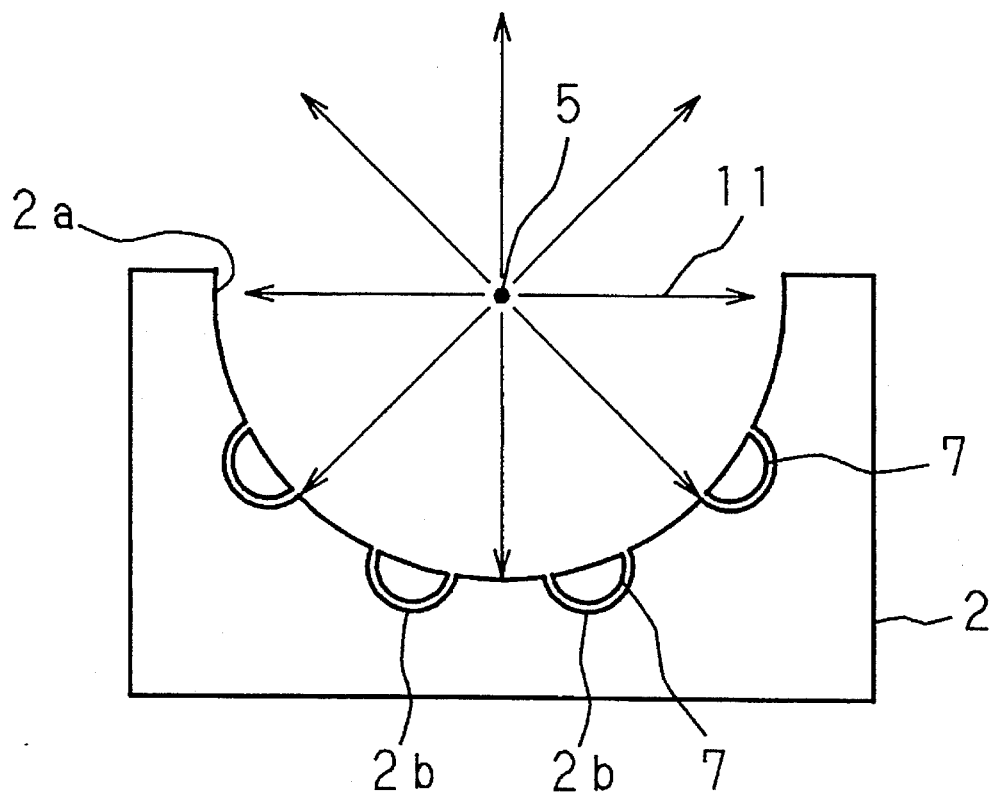
FIG. 2 is an enlarged cross sectional view of FIG. 1 taken along the line II—II.

FIG. 1 is a schematic vertical cross sectional view showing a structure of a shock wave sterilizer according to the first embodiment of the present invention, and FIG. 2 is an enlarged cross sectional view of FIG. 1 taken along the line II—II. In the drawings, numeral 1 denotes a container having the shape of a hollow rectangular box or a cylinder and made of shock resistant plastic or the like. The container 1 contains a holder 2, a pair of electrodes 3a and 3b, terminals 4a and 4b attached to the electrodes 3a and 3b respectively and disposed in alignment with each other, and a thin copper wire 5 stretched between the terminals 4a and 4b. Also contained in the container 1 is a pressure medium, e.g., water 6 filled to a certain depth so that the holder 2, the bottom section of the electrodes 3a and 3b, the terminals 4a and 4b and the thin copper wire 5 are immersed in the water 6. Alternatively, other types of liquid not harmful to human beings can be used instead of the water 6.

The holder 2 made of metal or synthetic resin is approximately rectangular. On the top surface of the holder 2, an approximately arcuate groove 2a is formed as shown in FIG. 2. On the circumferential wall of this groove 2a, a plurality of narrow grooves 2b each shaped approximately as an arc in cross section are formed approximately at equal intervals so as to be approximately parallel to an axis of the groove 2a. An elastic tube 7 is inserted with part of circumferential wall thereof inlaid in each arc groove 2b of the groove 2a.

The elastic tube 7 made of rubber or synthetic resin 7 is linked at its one end to a pipe 9 that supplies the material, such as food, to be sterilized which is disposed near one end portion of the holder 2, and is linked at its other end to a food discharge pipe 10. The food supply pipe 9 includes a check valve and a pump and penetrates the container 1 so as to be linked at its other end to an unprocessed food tank for containing unprocessed fluid food. The food discharge pipe 10 is also provided with a check valve and, penetrates the container 1 so as to be linked at its other end to a processed food tank for containing processed fluid food. Fluid food introduced into the elastic tubes 7 in the container 1 through the food supply pipe 9 from the unprocessed food tank is sterilized within the elastic tubes 7. Processed fluid food is ejected from the elastic tubes 7 into the processed food tank through the food discharge pipe 10.

The electrodes 3a and 3b are made of conductive material such as copper, and connected to a direct current source via lead wires A and B. A capacitor 8 is connected between the lead wires A and B. A switch C is installed on the lower end of either the lead wire A or B. In the vicinity of bottom ends of the electrodes 3a and 3b, the terminals 4a and 4b are disposed which are also made of conductive material and equipped with a chuck function. The thin copper wire 5 is stretched between the terminals 4a and 4b to fit with the center of curvature of the groove 2a. When the capacitor 8 intermittently discharges due to intermittent ON/OFF operations of the switch C, a current of about 80 kJ flows through the thin copper wire 5. When a current flows through the thin copper wire 5, the thin copper wire 5 is heated due to Joule heat, and is finally vaporized because of overheating. Because of the expansion in the volume of the thin copper wire 5 during vaporization, shock waves 11 are created. This takes about 30 microseconds from the start of application of the current. After the thin copper wire 5 was vaporized, a plasma is generated, through which an electric potential is created between the terminals 4a and 4b.

The shock waves 11 are transmitted into the groove 2a of the holder 2 and thence into the respective elastic tubes 7 in the groove 2a with the water 6 as a transfer medium as shown in FIG. 2. Hence, the shock waves are first applied onto fluid food which is contained in the elastic tubes 7 and the expansion waves are next applied onto the food with a little time delay. When the shock waves and the expansion waves are applied, differences in the shock impedance of materials constituting a cell of a bacteria create differences in pressure change within the cell. This in turn creates non-equilibrium force in the cell, and as a result, the cell is destroyed and the food is sterilized. The time required for radiating the shock waves is only a few hundred microseconds so that there will be no chemical change due to a high temperature or a change in the pressure. In the first embodiment, sterilization is performed while supplying fluid food into the elastic tubes 7 through the food supply pipe 9 and discharging processed food through the food discharge pipe 10. Therefore, successive sterilization can be easily realized.

Upon completion of one wire explosion, a new thin copper wire 5 is forwarded from one of the terminals 4a or 4b toward the other and held by the other, and the wire explosion as described above is then performed again. Thus, while food is passed through the elastic tubes 7 at a predetermined speed from the Food supply pipe 9 side, the shock waves can be applied on the food once or for a plurality of times.

A pressure applied to the Fluid food was calculated based on the speed of the shock waves which was estimated from photographs intermittently taken at a high speed by an image converter camera. That is, wire explosion under water was shot with the image converter camera, and a speed $u_c$ at the shock front was calculated. According to the calculation, the speed $u_c$ was 100 m/s.

From this value, an upward pressure $\Delta P$ was calculated in accordance with the equation (1) below.

$$\Delta P = \rho_0 U_s u_c \quad (1)$$

$$U_s = \rho_1(U_s - u_c)/\rho_0$$

$$P_1 = (P_0 + B)(\rho_1/\rho_0)^n$$

where
$U_s$: speed behind the shock wave
$u_c$: speed of the shock wave
$\rho_0$: density of the water
$\rho_1$: density of the water behind the shock wave
$P_0$: pressure of the water
$P_1$: pressure of the water behind the shock wave
n: 7.415
B: $2.963 \times 10^8$ Pa As a result, it was confirmed that the upward pressure $\Delta P$ was about at 3000 times atmospheric pressure. (Theoretically, the speeds of the shock waves drastically decrease due to the expansion waves.) However, the actual decrease was less drastic than the theoretical one. This is assumed to be because there still is a continued supply of energy due to discharging between the terminals 4a and 4b even after the thin copper wire 5 was vaporized.

EXAMPLE OF EXPERIMENT

A description will be given next on an actual result of sterilization of elastic tubes 7 containing microorganisms. Shock waves were generated by discharging electrical energy of 8 kJ at a thin wire which has a thickness of 0.2 mm. The holder 2 used was made of soft polyethylene which has a characteristic close to a shock impedance of the water 6. This is to protect the container against destruction due to interference among the shock waves. In this experiment, a peak pressure of 1000 times atmospheric pressure was created. A yeast used in the experiment was Saccha romyces cerevisiae of a size of about 5 to 10 micro-m. The length of Brine shrimps used was 0.5 mm. The yeast was introduced in the elastic tubes 7 so that the optical density was 0.3, and impact was applied on the yeast once in one test and five times in other test. Several tens of Brine shrimps were contained in each elastic tube 7 and subjected to impact for one time.

According to observation through a scanning electron microscope, 20% of the yeast died due to one application of impact. On the other hand, five applications of impact killed a proportionally larger percentage of the yeast. Hence, it is believed that destruction due to impact occurs in accordance with a probability. With respect to the destructed state, the destruction is not like a shear fracture of a cell wall like sonicator, but is rather like spalling.

According to observation through an optical microscope, most of the brine shrimps were fractured into small pieces after application of the impact.

From the above, it is understood that one to a few applications of impact realizes sterilization.

With respect to the arc grooves 2b, they can be winding grooves.

Embodiment 2

Figure 3:
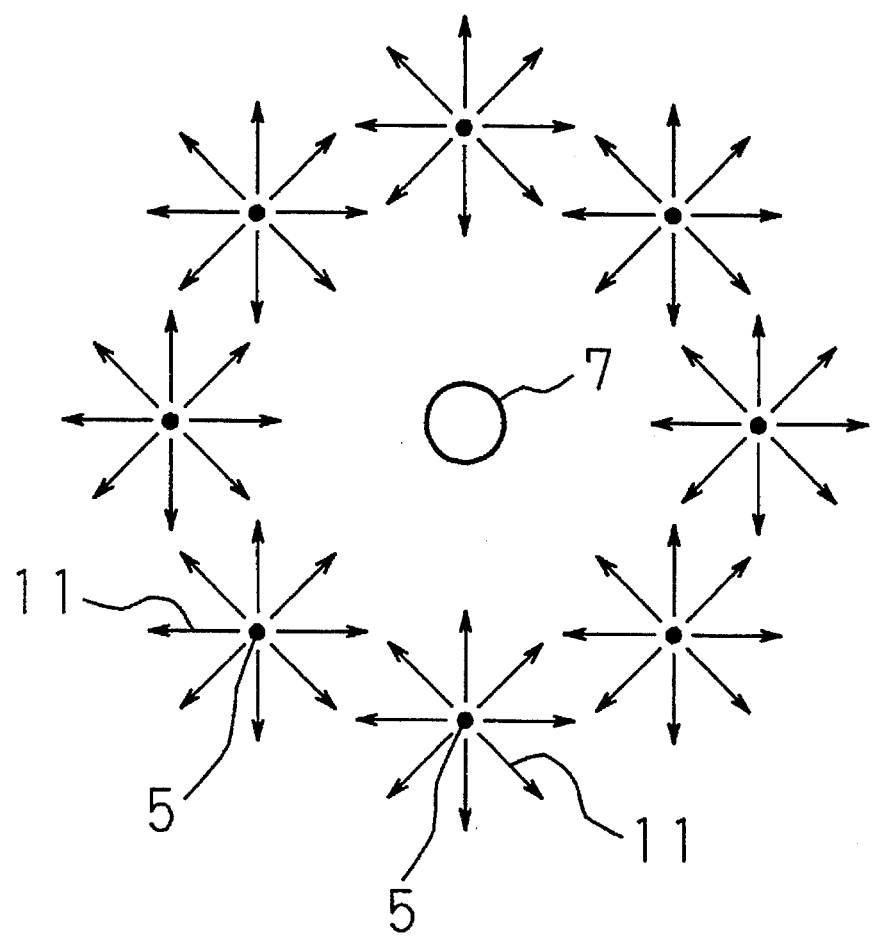
FIG. 3 is an enlarged cross sectional view showing a structure of a shock wave sterilizer according to a second embodiment of the present invention.

FIG. 3 is an enlarged cross sectional view showing a structure of a shock wave sterilizer according to the second embodiment of the present invention. FIG. 3 corresponds to FIG. 2. Although the first embodiment requires that a plurality of the elastic tubes are disposed in the grooves 2a of the holder 2, in the second embodiment, a plurality of thin copper wires 5 are disposed around one elastic tube 7 so as to be parallel to each other. The structure of the second embodiment is otherwise the same as that of the first embodiment.

The plurality of the thin copper wires 5 are exploded at the same time to radially apply shock waves upon the elastic tube 7. As a result, fluid food is sterilized.

Embodiment 3

Figure 4:
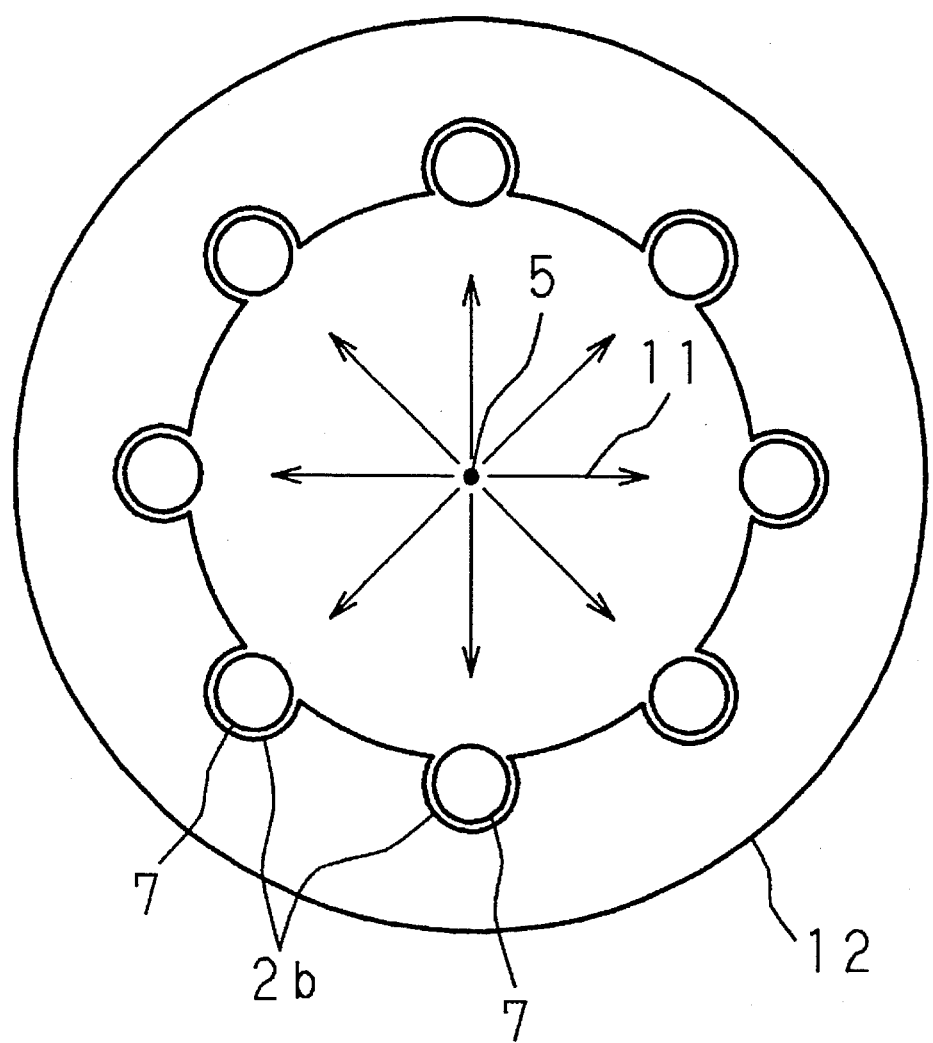
FIG. 4 is an enlarged cross sectional view showing a structure of a shock wave sterilizer according to a third embodiment of the present invention.

FIG. 4 is an enlarged cross sectional view showing a structure of a shock wave sterilizer according to the third embodiment of the present invention. FIG. 4 corresponds to FIG. 2. Although the first embodiment requires that the elastic tubes 7 are disposed in the groove 2a of the holder 2, in the third embodiment, the holder 2 is replaced with a cylindrical holder 12 which has a predetermined thickness. In the inner circumferential surface of the holder 12, a plurality of arc grooves 2b are formed to inlay elastic tubes 7. A thin copper wire 5 is disposed along a central line of the holder 12. The structure of the third embodiment is otherwise the same as that of the first embodiment.

By exploding the thin copper wire 5, shock waves are applied on the elastic tubes 7 which are disposed around the thin copper wire 5. As a result, fluid food is sterilized.

Embodiment 4

Figure 5:
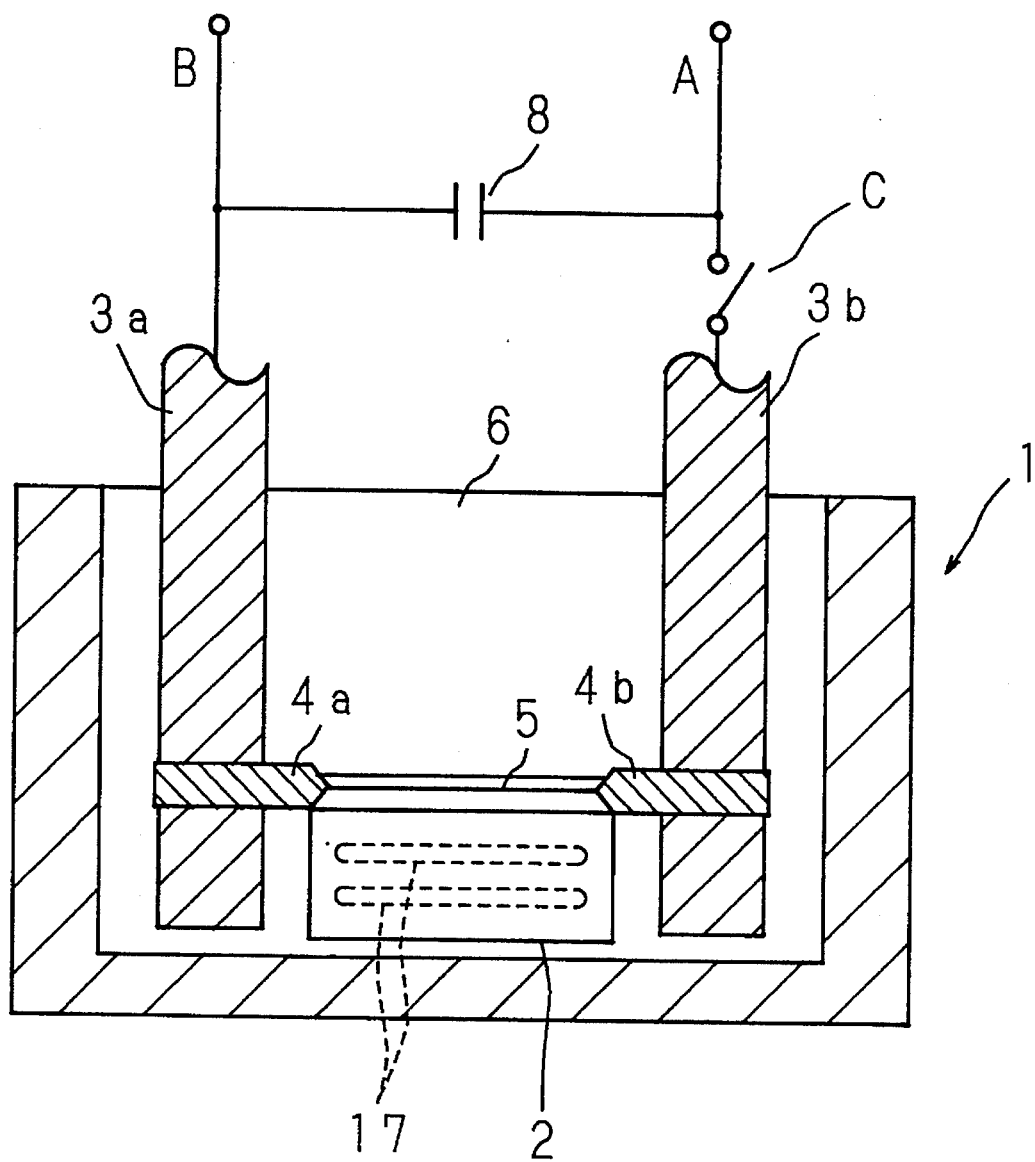
FIG. 5 is a schematic vertical cross sectional view showing a structure of a shock wave sterilizer according to a fourth embodiment of the present invention.

FIG. 5 is a schematic vertical cross sectional view showing a structure of a shock wave sterilizer according to the fourth embodiment of the present invention. FIG. 5 corresponds to FIG. 1. In the fourth embodiment, the elastic tubes 7 are replaced with elastic containers 17 each sealed at the both ends. Hence, the food supply pipe 9 and the food discharge pipe 10 are omitted. As in the first embodiment, the elastic containers 17 are inserted in the arc grooves 2b of the groove 2a which is formed in the holder 2.

In the fourth embodiment, by changing the elastic containers 17 to other elastic containers 17, batch sterilization can be performed.

Although the foregoing embodiments use the thin copper wire 5 as a shock wave source, any other conventional source can be used instead of the thin copper wire 5.

As this invention may be embodied in several forths without departing from the spirit of essential characteristics thereof, the present embodiment is therefore illustrative and not restrictive, since the scope of the invention is defined by the appended claims rather thin by the description preceding them, and all changes that fall within metes and bounds of the claims, or equivalence of such metes and bounds thereof are therefore intended to be embraced by the claims.

What is claimed is:

1. A shock wave sterilizer, comprising:

an elastic container for containing a fluid medium to be sterilized;

a shock wave source disposed to face said elastic container, said shock wave source comprising an electrical conductor connected to a source of electrical current of a value sufficient to heat said electrical conductor to a point at which said electrical conductor vaporizes and produces a shock wave; and a pressure transfer medium interposed between said shock wave source and said elastic container convey the force of the shock wave to said elastic container and the medium therein.

2. A shock wave sterilizer according to claim 1, further comprising:

a supply pipe for supplying the fluid medium to said elastic container; and a discharge pipe for discharging the sterilized processed fluid medium from said elastic container.

3. A shock wave sterilizer according to claim 1, wherein a plurality of said elastic containers are disposed around said shock wave source at equal distances from said shock wave source.

4. A shock wave sterilizer according to claim 1, wherein a plurality of said shock wave sources are disposed around said elastic container at equal distances from said elastic container.

5. A shock wave sterilizer according to claim 1, wherein said elastic container is tightly sealed.

6. A shock wave sterilizer as in claim 1 wherein said elastic container comprises a tube through which the fluid medium to be sterilized passes.

7. A shock wave sterilizer as in claim 6 wherein said tube has multiple sections which each receive the shock wave through said pressure transfer medium.

8. A shock wave sterilizer as in claim 6 wherein said shock wave source comprises a plurality of said electrical conductors located around said tube.

9. A shock wave sterilizer as in claim 7 wherein said multiple sections of said tube are placed around said electrical conductor.

10. A shock wave sterilizer as in claim 1 further comprising an outer housing on which said electrical conductor, elastic container and pressure transfer medium are disposed.

* * * * *